United States Patent
Mani et al.

(10) Patent No.: US 10,599,721 B2
(45) Date of Patent: Mar. 24, 2020

(54) METHOD AND APPARATUS FOR AUTOMATICALLY SUMMARIZING THE CONTENTS OF ELECTRONIC DOCUMENTS

(71) Applicant: OATH INC., New York, NY (US)

(72) Inventors: Inderjeet Mani, Chiang Mai (TH); Eugenio Ciurana, San Francisco, CA (US); Nicholas D'Aloisio-Montilla, London (GB); Bart K. Swanson, Remsenburg, NY (US)

(73) Assignee: OATH INC., New York, NY (US)

( * ) Notice: Subject to any disclaimer, the term of this patent is extended or adjusted under 35 U.S.C. 154(b) by 203 days.

(21) Appl. No.: 15/915,656

(22) Filed: Mar. 8, 2018

(65) Prior Publication Data

US 2018/0196804 A1 Jul. 12, 2018

Related U.S. Application Data

(63) Continuation of application No. 14/348,830, filed as application No. PCT/US2012/054572 on Sep. 11, 2012, now Pat. No. 9,916,309.

(Continued)

(30) Foreign Application Priority Data

Oct. 14, 2011 (GB) .................................. 1117848.0
Dec. 7, 2011 (GB) .................................. 1121033.3

(51) Int. Cl.
*G06F 17/30* (2006.01)
*G06F 17/27* (2006.01)
(Continued)

(52) U.S. Cl.
CPC ............ *G06F 16/93* (2019.01); *G06F 16/345* (2019.01); *G06F 17/22* (2013.01); *G06F 17/2745* (2013.01); *G06N 20/00* (2019.01)

(58) Field of Classification Search
CPC ............................. G06F 17/27; G06F 17/2229
See application file for complete search history.

(56) References Cited

U.S. PATENT DOCUMENTS 6,317,708 B1 * 11/2001 Witbrock ............ G06F 17/2715
704/9
6,766,287 B1 * 7/2004 Kupiec ................. G06F 17/274
704/9

(Continued)

FOREIGN PATENT DOCUMENTS

CN 1614585 A 5/2005
EP 0933712 A2 8/1999

OTHER PUBLICATIONS

Chin-Yew Lin: "Rouge: A Package for Automatic Evaluation of Summaries," Proceedings of Workshop on Text Summarization 2004, Jul. 21, 2004 (Jul. 21, 2004), Barcelona, Spain, 8 pages.

(Continued)

*Primary Examiner* — Scott T Baderman
*Assistant Examiner* — Mario M Velez-Lopez
(74) *Attorney, Agent, or Firm* — James J. DeCarlo; Greenberg Traurig, LLP

(57) ABSTRACT

One embodiment of a method for summarizing an electronic document includes splitting the electronic document into a plurality of terms, wherein each of the plurality of terms is associated with a respective length, a respective informativeness score, and a respective coherence score, automatically selecting a subset of the plurality of terms, such that an aggregate informativeness score of the subset is maximized while an aggregate length of the subset is less than or equal to a maximum length, and arranging the subset as a summary of the electronic document.

21 Claims, 7 Drawing Sheets

Related U.S. Application Data

(60) Provisional application No. 61/568,188, filed on Dec. 8, 2011.

(51) Int. Cl.
  *G06F 16/93* (2019.01)
  *G06N 20/00* (2019.01)
  *G06F 16/34* (2019.01)
  *G06F 17/22* (2006.01)

(56) References Cited

U.S. PATENT DOCUMENTS

| | | | | |
|---|---|---|---|---|
| 7,310,633 | B1* | 12/2007 | Wang | G06F 16/338 |
| | | | | 707/742 |
| 7,698,339 | B2* | 4/2010 | Zhang | G06F 16/35 |
| | | | | 707/755 |
| 8,239,755 | B2 | 9/2012 | Maguire | |
| 8,543,380 | B2 | 9/2013 | MarvIt | |
| 8,819,023 | B1 | 8/2014 | Wang | |
| 8,868,670 | B2* | 10/2014 | Bagga | G06Q 10/107 |
| | | | | 709/207 |
| 9,116,864 | B2* | 8/2015 | Tsai | G06F 17/212 |
| 9,767,165 | B1 | 9/2017 | Tacchi | |
| 10,042,924 | B2* | 8/2018 | Billawal | G06F 16/345 |
| 2002/0103836 | A1* | 8/2002 | Fein | G06F 17/241 |
| 2002/0133480 | A1* | 9/2002 | Boguraev | G06F 17/214 |
| 2002/0138528 | A1* | 9/2002 | Gong | G06F 17/27 |
| | | | | 715/254 |
| 2003/0079185 | A1* | 4/2003 | Katariya | G06F 17/27 |
| | | | | 715/234 |
| 2004/0243645 | A1* | 12/2004 | Broder | G06F 16/3344 |
| 2005/0091203 | A1 | 4/2005 | Liu et al. | |
| 2005/0096897 | A1 | 5/2005 | Ando et al. | |
| 2006/0122889 | A1 | 6/2006 | Burdick et al. | |
| 2006/0206806 | A1* | 9/2006 | Han | G06F 16/345 |
| | | | | 715/236 |
| 2007/0118506 | A1 | 5/2007 | Kao et al. | |
| 2007/0118518 | A1 | 5/2007 | Wu et al. | |
| 2008/0109399 | A1 | 5/2008 | Ciya et al. | |
| 2008/0109425 | A1* | 5/2008 | Yih | G06F 16/345 |
| 2008/0109454 | A1 | 5/2008 | Willse et al. | |
| 2009/0119284 | A1* | 5/2009 | Chen | G06F 16/345 |
| 2010/0161378 | A1 | 6/2010 | Josifovski et al. | |
| 2011/0060983 | A1 | 3/2011 | Cai et al. | |
| 2012/0035912 | A1 | 2/2012 | Litvak et al. | |
| 2012/0076414 | A1 | 3/2012 | Xu et al. | |
| 2014/0279798 | A1* | 9/2014 | Purohit | G06Q 50/01 |
| | | | | 706/47 |

OTHER PUBLICATIONS

Mihalcea, Rada: "Graph-based ranking algorithms for sentence extraction, applied to text summarization," Proceedings of the ACL 2004 on Interactive Poster Demonstration Sessions, Jul. 1, 2004 (Jul. 1, 2004), 4 pages.

European Supplementary Search Report (EP 12 84 6059) dated Apr. 29, 2015, 2 pages.

* cited by examiner

METHOD AND APPARATUS FOR AUTOMATICALLY SUMMARIZING THE CONTENTS OF ELECTRONIC DOCUMENTS

CROSS REFERENCE TO RELATED APPLICATIONS

This application is a continuation of and claims priority from co-pending U.S. patent application Ser. No. 14/348,830, filed on Nov. 3, 2014, entitled "METHOD AND APPARATUS FOR AUTOMATICALLY SUMMARIZING THE CONTENTS OF ELECTRONIC DOCUMENTS," which is the national stage of PCT application PCT/US12/54572, which claims the benefit of United Kingdom Patent Application No. 1121033.3, filed Dec. 7, 2011, and U.S. Provisional Patent Application Ser. No. 61/568,188, filed Dec. 8, 2011, all of which are herein incorporated by reference in their entireties.

FIELD OF THE INVENTION

The present invention generally relates to the field of electronic documents, and more specifically relates to the summarization of electronic documents.

BACKGROUND

A typical search performed using a search engine on the World Wide Web produces a plurality of search results (e.g., electronic documents including news stories, Web pages, social media content, and the like). However, at least a portion of the search results is often not relevant to the search. Moreover the content of even the relevant search results may vary from document to document.

Additionally, social media allows users to recommend various electronic documents to other users. However, when faced with just a uniform resource locator (URL) or title, it may be difficult to tell whether the linked electronic document is likely to be of interest.

Thus, finding a document whose contents are truly relevant or of interest involves some trial and error, as the user may have to sort through a plurality of documents one-by-one, with little prior knowledge of their contents. This can be a time consuming exercise, particularly if any of the documents are long (e.g., as in the case of books or some news articles). If executed on a mobile device (e.g., a smart phone), reviewing the various documents one-by-one can take even more time, as the documents may require more time to read and load on the device.

SUMMARY OF THE INVENTION

One embodiment of a method for summarizing an electronic document includes splitting the electronic document into a plurality of terms, wherein each of the plurality of terms is associated with a respective length, a respective informativeness score, and a respective coherence score, automatically selecting a subset of the plurality of terms, such that an aggregate informativeness score of the subset is maximized while an aggregate length of the subset is less than or equal to a maximum length, and arranging the subset as a summary of the electronic document.

In further embodiments, the subset comprises less than all of the plurality of terms; at least one of the terms comprises a sentence; the respective informativeness score for a given term of the plurality of terms is assigned in accordance with a scoring technique that is language-independent; the scoring technique assigns weights to a plurality of features of the given term in accordance with a set of hand-coded rules; the respective informativeness score for a given term of the plurality of terms is assigned in accordance with a scoring technique that is language-dependent; the scoring technique is a supervised machine-learning technique that employs a statistical classifier; the statistical classifier is a support vector machine; the scoring technique is an unsupervised machine-learning technique that represents the given term as a weighted node in a directed graph; the respective informativeness score for each of the plurality of terms is at least equal to a threshold; respective coherence scores of each of the plurality of terms are at least equal to a threshold; the method further comprises pruning each the plurality of terms subsequent to the splitting, but prior to the automatically selecting; wherein the automatically selecting is performed using a combinatorial optimizer; the automatically selecting comprises evaluating each of the plurality of terms individually for inclusion in the subset; the evaluating comprises excluding from inclusion in the subset those of the plurality of terms whose the respective lengths exceed a current aggregate length of the subset; the evaluating comprises, for a given term of the plurality of terms, calculating a first sum, wherein the first sum is a sum of the respective informativeness scores associated with a most informative subset of the plurality of terms that excludes the given term and has an aggregate length less than or equal to the maximum length, calculating a second sum, wherein the second sum is a sum of a first value and a second value, wherein the first value is equal to the first sum minus the respective length of the given term, and the second value is the respective informativeness score of the given term, and determining whether to include the given term in the subset based on a comparison of the first sum and the second sum; the determining comprises including the given term in the subset when the second sum is greater than the first sum and excluding the given term from the subset when the first sum is greater than the second sum; the plurality of terms is arranged according to an order in which each of the plurality of terms appears in the electronic document; the method further comprises determining, prior to the splitting, the automatically selecting, and the arranging, that the electronic document is summarizable; the determining comprises generating a feature vector for the electronic document, wherein the feature vector comprises a plurality of features of the electronic document, assigning a weight to each of the plurality of features, and assigning a score to the electronic document in accordance with the weight assigned to each of the plurality of features, wherein the score indicates whether the electronic document is summarizable; the weight is automatically learned; the assigning the weight comprises, for a given feature of the plurality of features, boosting the weight when the given feature occurs with at least a defined frequency in a set of training examples comprising documents that are summarizable and boosting the weight when the given feature occurs with at least a defined frequency in a set of training examples comprising documents that are summarizable; and the assigning the weight and the assigning the score are performed in a manner that is specific to a language in which the electronic document is written.

One embodiment of a tangible computer readable medium containing an executable program for summarizing an electronic document, includes a program that performs operations including splitting the electronic document into a plurality of terms, wherein each of the plurality of terms is associated with a respective length, a respective informativeness score, and a respective coherence score, automatically selecting a subset of the plurality of terms, such that an aggregate informativeness score of the subset is maximized while an aggregate length of the subset is less than or equal to a maximum length, and arranging the subset as a summary of the electronic document.

One embodiment of a system for summarizing an electronic document includes a processor and a computer readable medium containing an executable program that causes the processor to perform operations including splitting the electronic document into a plurality of terms, wherein each of the plurality of terms is associated with a respective length, a respective informativeness score, and a respective coherence score, automatically selecting a subset of the plurality of terms, such that an aggregate informativeness score of the subset is maximized while an aggregate length of the subset is less than or equal to a maximum length, and arranging the subset as a summary of the electronic document.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for automatically summarizing the contents of electronic documents. Embodiments of the invention facilitate concise and efficient content consumption by summarizing the contents of electronic documents without requiring the electronic documents to be loaded on a device. In one embodiment, the invention is implemented as an application for a mobile device, such as a smart phone or a tablet computer, where the mobile device interacts with a remote server over a network.

Figure 1:
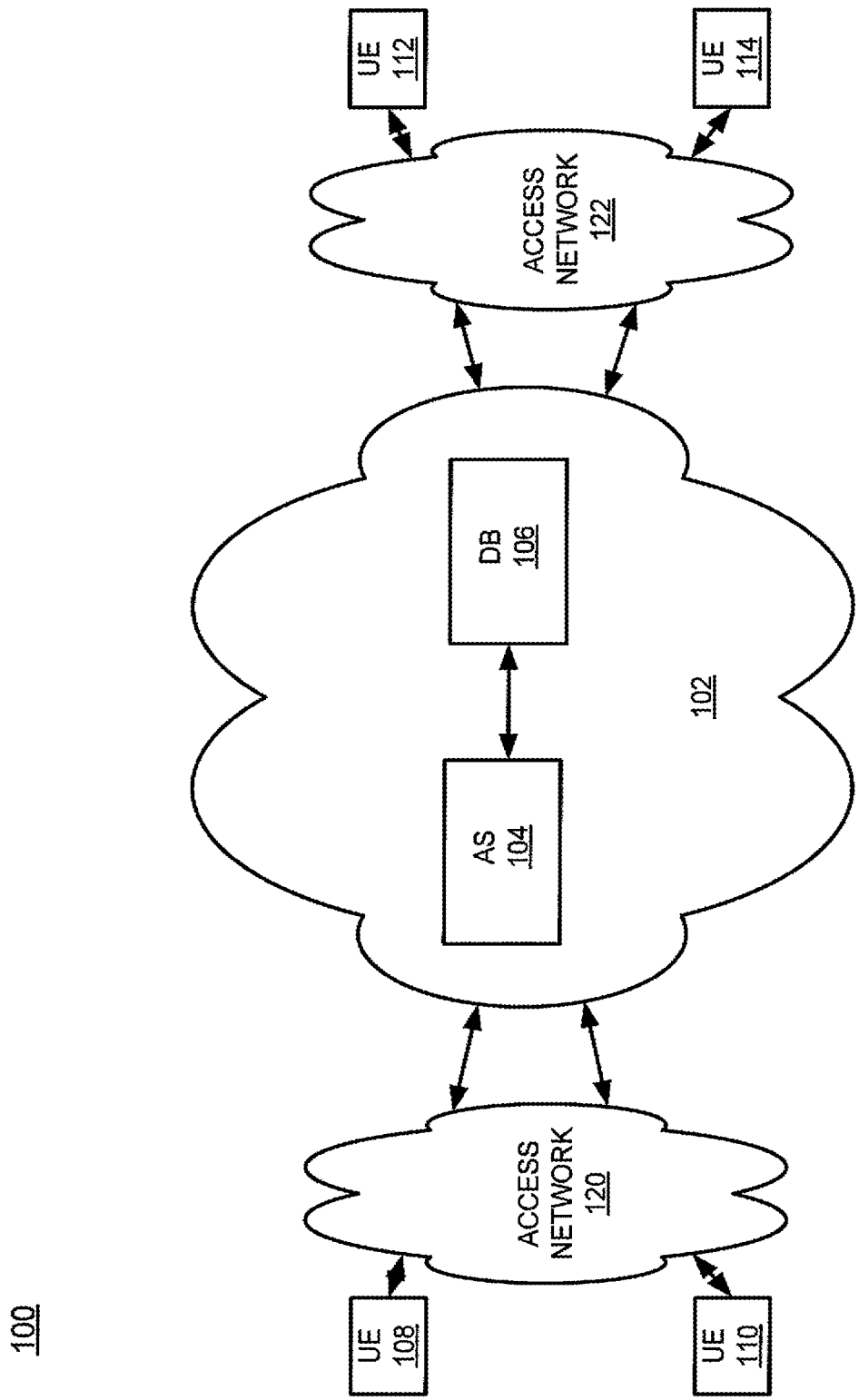
FIG. 1 is a block diagram depicting one example of a communications network within which embodiments of the present invention may be deployed.

FIG. 1 is a block diagram depicting one example of a communications network 100 within which embodiments of the present invention may be deployed. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

Figure 7:
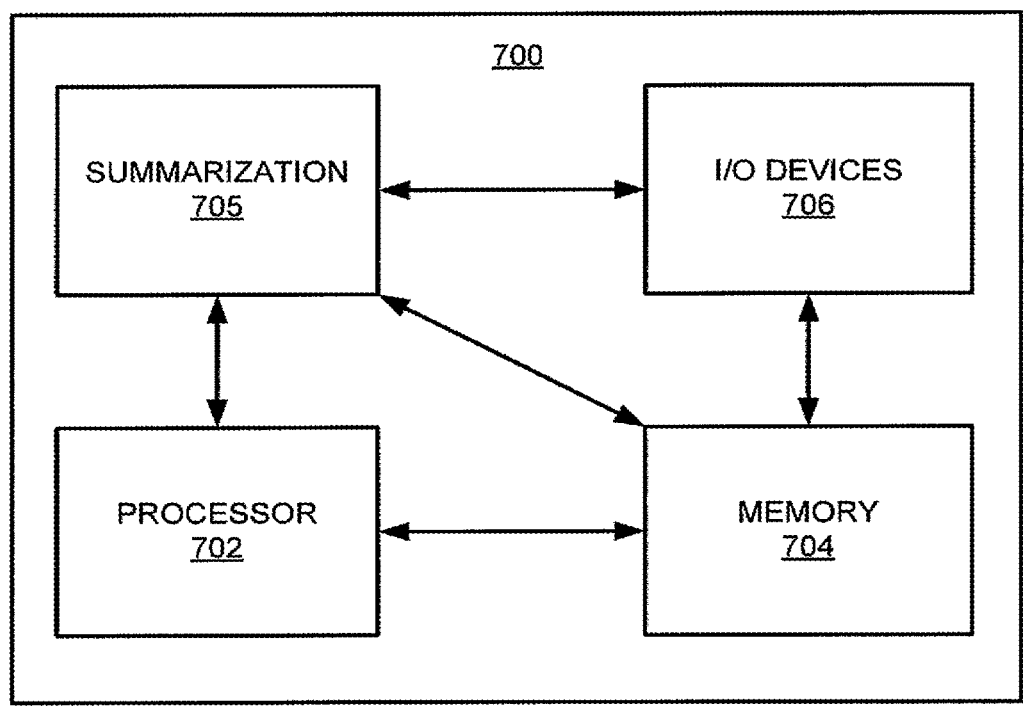
FIG. 7 is a high level block diagram of the present invention implemented using a general purpose computing device.

In one embodiment, the AS 104 may comprise a general purpose computer as illustrated in FIG. 7 and discussed below. In one embodiment, the AS 104 may perform the methods and algorithms discussed below related to summarizing the contents of electronic documents.

In one embodiment, the DB 106 stores summaries of electronic documents that have been harvested and summarized by the AS 104. In a further embodiment, the DB 106 may optionally store profiles for users of the network 100. For example, the DB 106 may store cellular telephone numbers, email addresses, social media profiles, and the like for each user. This personal information may be stored in encrypted form in order to protect the users' privacy. Furthermore, user authorization may be required in order for the DB 106 to store any personal information. In addition, the DB 106 may store the users' preferences with respect to the types of content in which they are interested (e.g., news articles related to entertainment, sports, science, etc.).

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed. In one embodiment, any of the user endpoint devices may have one or more sensors integrated therein. These sensors may include, for example, location sensors, environmental sensors, acoustic sensors, position sensors, optical sensors, pressure sensors, proximity sensors, and the like. The AS 104 may subscribe to the outputs of these sensors, as discussed in greater detail below.

It should be noted that the network 100 has been simplified. For example, the network 100 may include other network elements (not shown) such as border elements, routers, switches, policy servers, security devices, a content distribution network (CDN) and the like.

Figure 2:
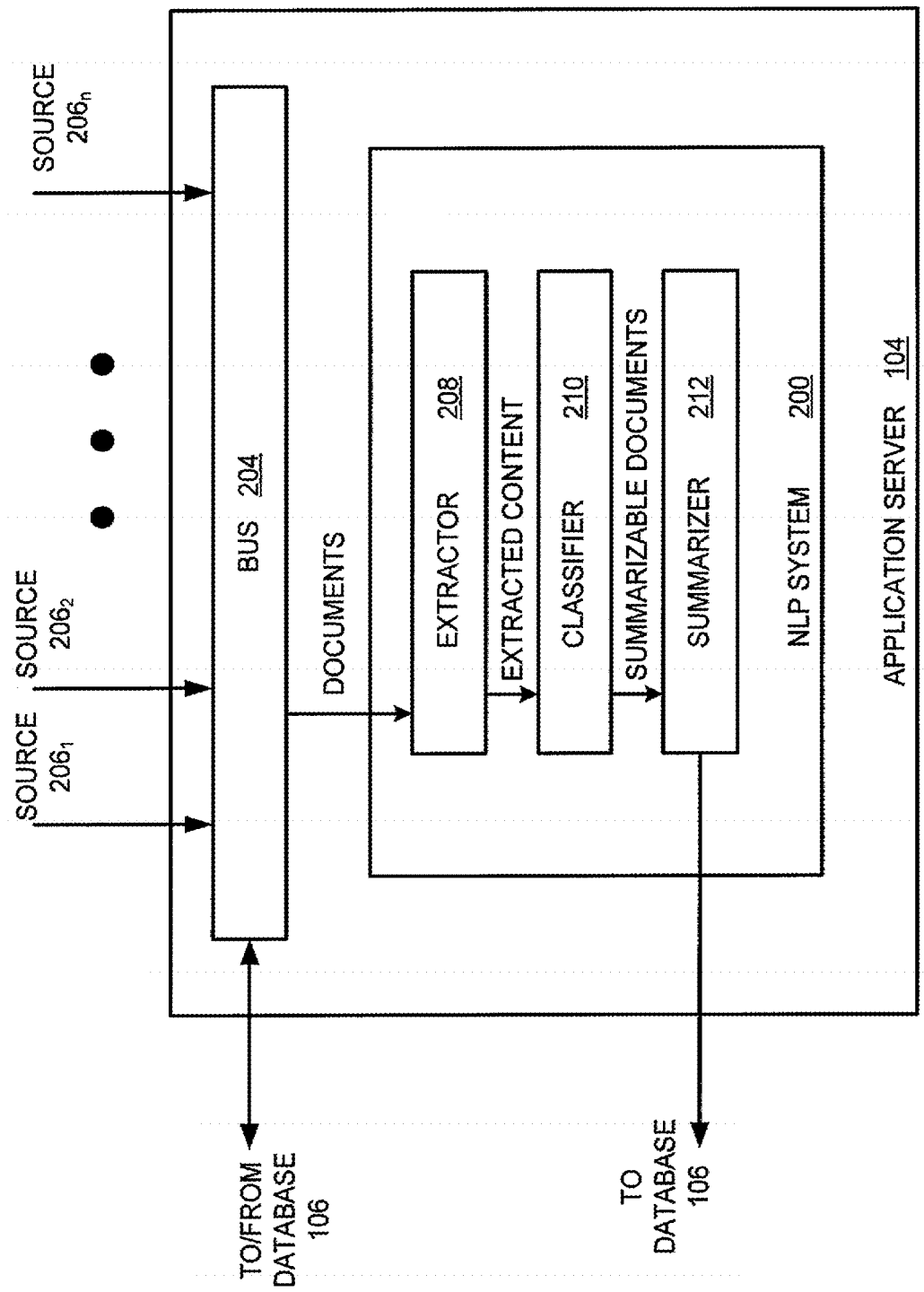
FIG. 2 is a block diagram depicting a more detailed embodiment of the application server illustrated in FIG. 1.

FIG. 2 is a block diagram depicting a more detailed embodiment of the application server 104 illustrated in FIG. 1. As illustrated, the AS 104 generally comprises a natural language processing (NLP) system 200 and a bus 204.

The bus 204 harvests electronic documents from a plurality of sources $206_1$-$206_n$ (hereinafter collectively referred to as "sources 206"). In one embodiment, the bus 204 pulls these documents from the sources 206. Thus, the documents may include, for example, Web feeds (e.g., rich site summary (RSS) feeds, Atom feeds, etc.) and Web pages (e.g., news sites, social media sites, etc.). The bus 204 forwards harvested documents to the NLP system 200 for further processing and summarization, as discussed in greater detail below. In one embodiment, the bus 206 is a Mule enterprise service bus (ESB).

The NLP system 200 generally comprises an extractor 208, a classifier 210, and a summarizer 212. The extractor 208 comprises a first filter that receives harvested documents from the bus 204 and extracts content from the documents. In one embodiment, the extracted content comprises one or more of: text, images, or video. The extracted content may be in any language. In one embodiment, the extractor 208 employs a heuristic approach to extracting the content.

The classifier 210 comprises a second filter that receives at least some of the extracted content from the extractor 208 and determines, based on the extracted content, whether the source document can be summarized. In one embodiment, the classifier 210 is a statistical classifier that uses trained (e.g., supervised) language models. For instance, in one specific embodiment, the classifier 210 is a linear regression classifier.

The summarizer 212 receives the source documents that are determined by the classifier to be summarizable and summarizes the documents. In one embodiment, the summarizer 212 produces at least two summaries of different lengths. For instance, the summarizer 212 may produce a "short" summary and a "long" summary, where the long summary is approximately thirty-three to fifty percent longer than the short summary (e.g., the short summary may be limited to approximately 390 characters, while the long summary is limited to approximately 590 characters). The summarizer 212 outputs the summary or summaries to the database 106 for storage. The database 106 may, in turn, push the summaries to one or more user endpoint devices 108, 110, 112 and 114, as discussed in greater detail below.

Figure 3:
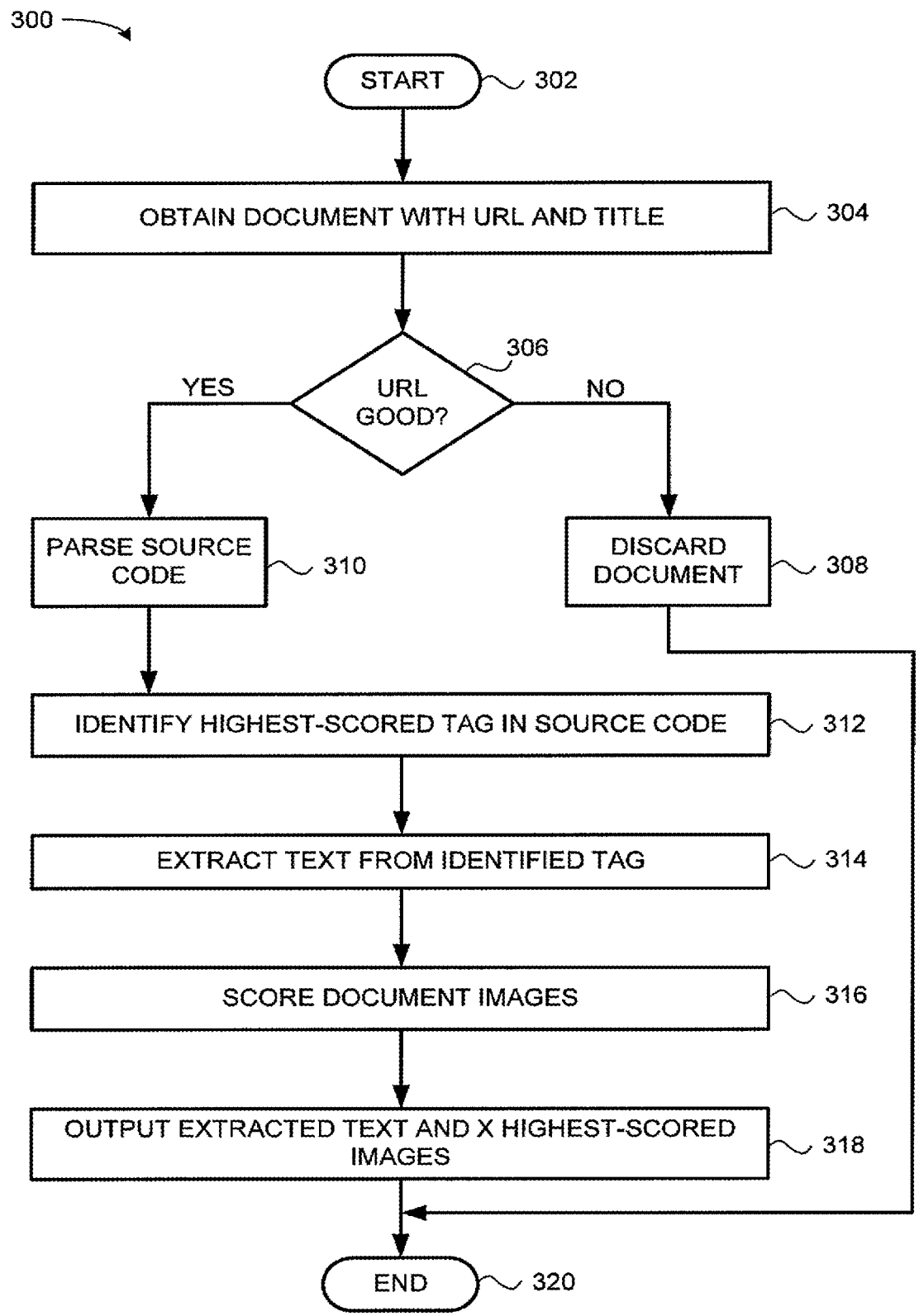
FIG. 3 is a flow diagram illustrating one embodiment of a method for extracting content from an electronic document, according to the present invention.

FIG. 3 is a flow diagram illustrating one embodiment of a method 300 for extracting content from an electronic document, according to the present invention. The method 300 may be implemented, for example, at the application server 104 illustrated in FIGS. 1 and 2. As such, reference is made in the discussion of the method 300 to various elements illustrated in FIG. 2. It will be appreciated however, that the method 300 is not limited to implementation with the server configuration illustrated in FIG. 2, and that such references are made largely to facilitate explanation.

The method 300 begins in step 302. In step 304, the bus 204 obtains an electronic document having a URL and a title. As discussed above, the bus 204 may pull the document from the network 100. In one embodiment, the document is a Web feed or a Web page.

In step 306, the extractor 208 determines whether the URL is good (i.e., contains content that is appropriate for summarization). For instance, certain documents such as letters, discussions, advertisements, contact addresses, or the like may not be appropriate for summarization. In one embodiment, this determination is made in accordance with one or more pre-specified patterns. For instance, patterns such as story|entry|page|content|text|body or the like may indicate content that is appropriate for summarization, while patterns such as vcard|promotion|bannerstrip|masthead or the like may indicate content that is not appropriate for summarization. If the extractor 208 concludes in step 306 that the URL is not good, then the extractor 208 discards the document in step 308 before the method 300 ends in step 320.

Alternatively, if the extractor 208 concludes in step 306 that the URL is good, then the method 300 proceeds to step 310. In step 310, the extractor 208 parses the document's source code (e.g., hypertext markup language (HTTP) code). In one embodiment, parsing the source code includes collecting a list of all paragraphs in the document object model (DOM) tree, where paragraphs include any elements that are marked with a paragraph tag (i.e., <p>) or a header tag (e.g., <h1>). Each such paragraph is assigned an initial (default) score, and the closest relevant structural tag is assigned a score that is the sum of the scores of the paragraphs associated with the tag. In one embodiment, a structural tag is considered to be relevant to a paragraph if the structural tag is a <div> tag having a class or ID attribute indicating that it has text content.

In step 312, the extractor 208 identifies the tag in the source code having the highest score, where the score is based on the above-described augmentation scheme. This tag represents the DOM node containing the most relevant content.

In step 314, the extractor 208 extracts text from the identified tag's source code. In one embodiment, the extractor 208 employs an extraction technique that eliminates text under nodes that are likely to contain irrelevant material (e.g., image captions, navigation links, by-lines, and links to social media sites).

In step 316, the extractor 208 scores the set of all images referenced in the document. Scoring identifies images that are most likely to be relevant (i.e., directly related to the content being summarized). Relevant images may include, for example, images that have features such as being in-line with the main document content, images that are larger than a defined minimum size (e.g., large images are most likely to be relevant to the document), joint photographic experts group (JPEG) format images (e.g., irrelevant images such as icons and logos tend to come in different formats such as portable network graphics (PNG) and graphics interchange format (GIF) formats), and images that originate at the same source as the document (e.g., advertising images are often imported from external sources). Irrelevant images may include, for example, icons, logos, navigation elements, advertisements, or the like.

In one embodiment, the scoring technique is a weighted technique, where the weights are based on various features of the images. These features may include metadata relating to the images as well image content (e.g., obtained via image processing techniques). For instance, the features may include whether a given image is the right size or in what type of file format the image is stored. A linear combination of weights is then summed and scaled (e.g., on a scale from zero to one). For instance, one weighted algorithm for scoring an image may be defined as follows:

$$\text{Score}(y) = \beta_0 + \sum_{j=1}^{n} \beta_j * \text{Value}(Feat_j) \quad \text{(EQN. 1)}$$

In the case of EQN. 1, an image feature is denoted as j ($j=\{1, \ldots, n\}$), and the score of the image is equal to a constant weighting coefficient, $\beta_0$, added to the sum of the product of each feature's weighting coefficient, $\beta_j$, and value. In general, the extractor 208 considers each feature as either present (in which case the value is one) or not present (in which case the value is zero). However, in one embodiment, where EQN. 1 is used in the summarization context, the value of a feature is a number reflecting how many times the feature occurs in the document.

In step 318, the extractor 208 outputs (e.g., to the classifier 210) the extracted text and the x highest-scored images (in one embodiment, x=3). In one embodiment, the x highest scored images must have scores above a defined threshold, $\theta$ (in one embodiment, $\theta=0.67$), in order to be output by the extractor 208. In one embodiment, the scores for the x highest scored images are also output by the extractor 208.

The method 300 then ends in step 320.

Figure 4:
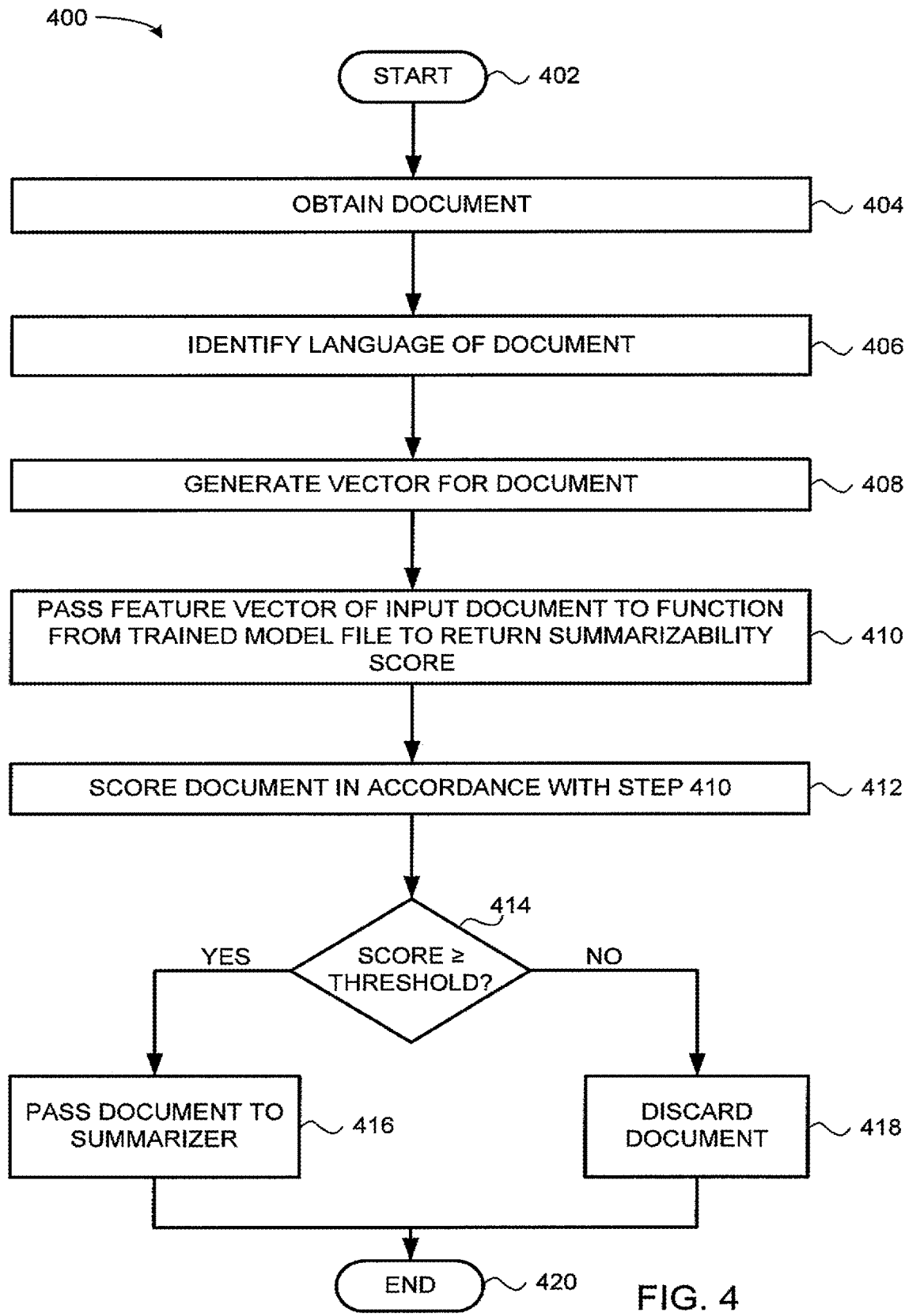
FIG. 4 is a flow diagram illustrating one embodiment of a method for determining whether an electronic document can be summarized, according to the present invention

FIG. 4 is a flow diagram illustrating one embodiment of a method 400 for determining whether an electronic document can be summarized, according to the present invention. The method 400 may be implemented, for example, at the application server 104 illustrated in FIGS. 1 and 2. As such, reference is made in the discussion of the method 400 to various elements illustrated in FIG. 2. It will be appreciated however, that the method 400 is not limited to implementation with the server configuration illustrated in FIG. 2, and that such references are made largely to facilitate explanation.

The method 400 begins in step 402. In step 404, the classifier 210 obtains an electronic document (e.g., from the bus 204). In step 406, the classifier 210 identifies the language of the document. In one embodiment, the language is identified by consulting a language code or identifier associated with the document. However, in an alternate embodiment, the classifier 1 through includes a language identification component that identifies the language by analyzing the document contents. In one embodiment, the present invention is language-independent, meaning that the systems and methods disclosed herein (such as the remaining steps of the method 400) are applicable regardless of the language in which the source document is written.

In step 408, the classifier 210 generates a feature vector for the document. In one embodiment, the feature vectors are designed to be robust to variations in language, genre, document length, and the like and include feature counts (e.g., for letters, digits, uppercase and lowercase letters, whitespace and punctuation characters, words, top m words, top y characters, unique words, etc.).

In step 410, the classifier 210 passes the feature vector of the document to a function for the identified language stored in a (compiled) "model" file to return a summarizability score. In one embodiment, the stored function takes the form of EQN. 1, where y now represents the summarizability score of the document and the exemplary features are the features described above in connection with step 408. The weighting coefficients 13 are learned automatically during a classifier training phase, prior to system deployment. For instance, in the machine learning program, the positive training examples (e.g., in a folder of summarizable documents) result in boosted weights for features that are relatively prevalent (e.g., occurs with at least a defined frequency) in the positive examples, while the negative training examples (e.g., in a folder of documents that are not summarizable) result in lowered weights for features that are relatively prevalent (e.g., occurs with at least a defined frequency) in the negative examples. In one embodiment, the classifier maintains a plurality of folders for each language that the application server 104 is capable of processing. A first folder comprises a plurality of exemplary documents that can be summarized (i.e., positive training examples, as discussed above), while a second folder comprises a plurality of exemplary documents that cannot be summarized (i.e., negative training examples, as discussed above). In one embodiment, types of documents that cannot be summarized include letters to the editor, opinion-editorial articles, and works of fiction; other types of documents are potentially summarizable.

In step 412, the classifier 210 scores the document in accordance with the computation performed in step 410. In one embodiment, the feature vector constructed from the input document is passed to a function based on EQN. 1 whose coefficients are learned automatically during a pre-deployment training phase, as discussed above.

In step 414, the classifier 210 determines whether the document's score (as generated in step 412) is greater than or equal to a defined threshold. If the classifier 210 concludes in step 414 that the document's score is greater than or equal to the threshold, then this indicates that the document can be summarized. As such, the method 400 proceeds to step 416, and the classifier 210 passes the document to the summarizer 212 for summarization.

Alternatively, if the classifier 210 concludes in step 414 that the document's score is less than the threshold, then this indicates that the document cannot be summarized. As such, the method 400 proceeds to step 418, and the document is discarded.

Once the document has either been passed to the summarizer (in accordance with step 416) or discarded (in accordance with step 418), the method 400 ends in step 420.

As discussed above, the classifier 210 employs a model trained on exemplary documents in order to weight the features of a document's feature vector. In one embodiment, the exemplary documents may be labeled by a human operator as summarizable or not summarizable. In an alternative embodiment, the labeling is bootstrapped either by using pre-existing corpora that have been labeled for some other task or by using statistics from an unlabeled collection of documents in order to determine whether a given document in the collection is or is not summarizable. In the latter case, a relevant statistic might be, for example, document length (e.g., where documents that are too short or too long relative to a length distribution can be labeled as not summarizable). As also discussed above, the classifier 210 may employ a plurality of models for different languages.

Figure 5:
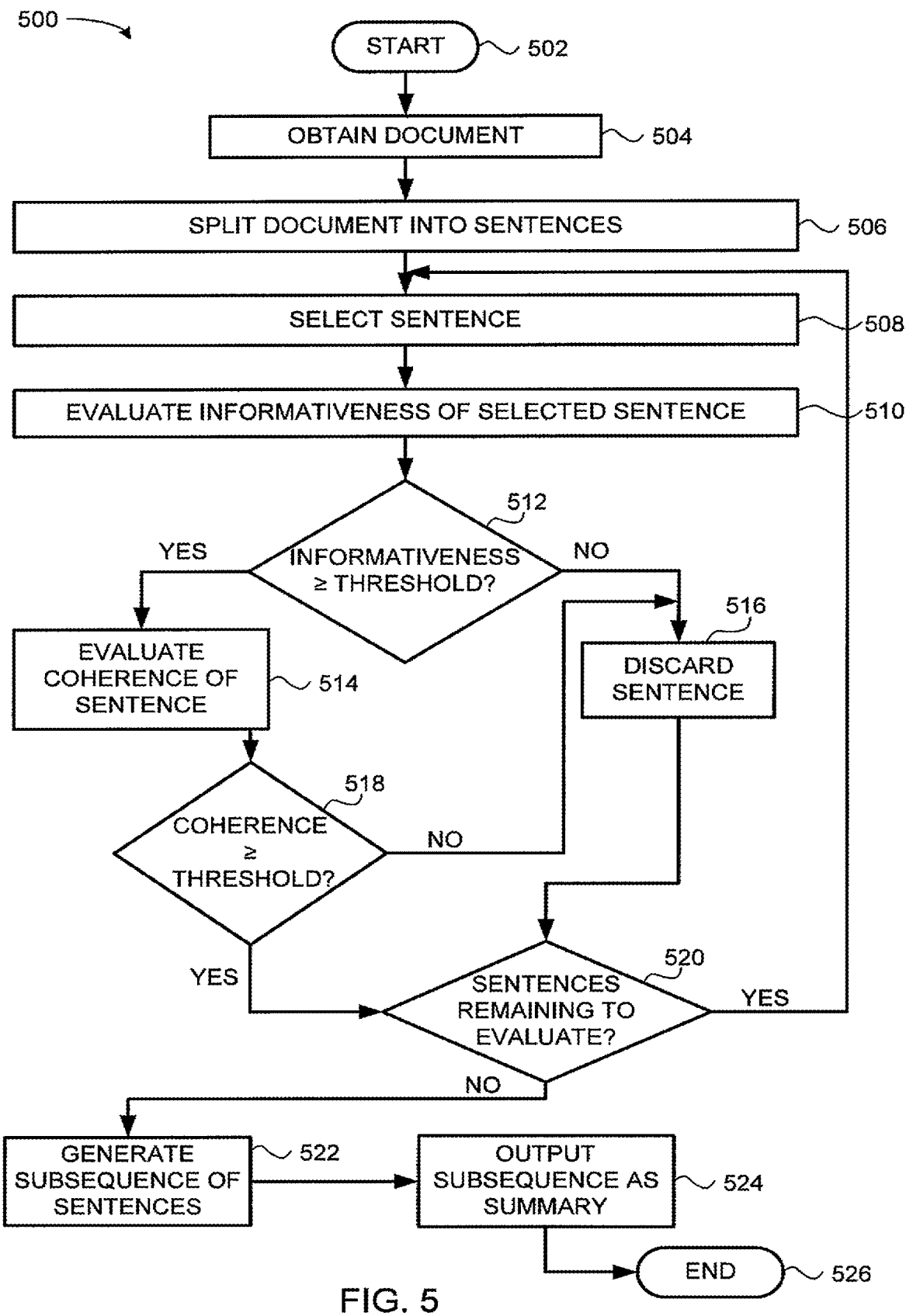
FIG. 5 is a flow diagram illustrating one embodiment of a method for summarizing an electronic document, according to the present invention.

FIG. 5 is a flow diagram illustrating one embodiment of a method 500 for summarizing an electronic document, according to the present invention. The method 500 may be implemented, for example, at the application server 104 illustrated in FIGS. 1 and 2. As such, reference is made in the discussion of the method 500 to various elements illustrated in FIG. 2. It will be appreciated however, that the method 500 is not limited to implementation with the server configuration illustrated in FIG. 2, and that such references are made largely to facilitate explanation.

The method 500 begins in step 502. In step 504, the summarizer 212 obtains an electronic document (e.g., from the bus 204).

In step 506, the summarizer 212 splits the document into a plurality of sentences. Although sentences are used for ease of explanation, it will be appreciated that the document could also be split into other text units, such as phrases, clauses, paragraphs, or blocks, or combinations of different types of text units. In one embodiment, the splitting is accomplished using a sentence splitter that breaks text into sentences (or other text units) based on a trained language model. In a further embodiment, the splitter is configured for the language in which the document is written.

In step 508, the summarizer 212 selects one of the sentences for evaluation. In one embodiment, the sentences are evaluated in the order in which they appear in the document.

In step 510, the summarizer 212 evaluates the informativeness of the sentence. In one embodiment, the informativeness is evaluated in accordance with one of a plurality of available algorithms. For instance, in one embodiment, three algorithms are used: (1) a first algorithm that is always used for short summaries (e.g., shorter than approximately 390 characters); (2) a second algorithm that is always used for long summaries (e.g., thirty-three to fifty percent longer than the short summaries) and when an English language-trained model based on reference summaries is desired; and (3) a third, unsupervised algorithm that is used in all other instances.

In one embodiment, the first algorithm employs a set of hand-coded rules based on a plurality of language-independent features. These features may include, for example, the position of the sentence within the document or the length of the sentence. In one embodiment, these features are transformed into Boolean features (e.g., "does this sentence appear in the first x sentences of the document?" or "is the sentence length shorter/longer than y characters?") and are then weighted in a manner similar to the weighting discussed above with reference to EQN. 1. The output of the first algorithm is an array of informativeness scores for each sentence.

In one embodiment, the second algorithm is a supervised machine-learning technique trained on human-created reference summaries. The second algorithm attempts to maximize a function based on the known Recall-Oriented Understudy for Gisting Evaluation (ROUGE) metric, as disclosed by Chin-Yew Lin in "ROUGE: A Package for Automatic Evaluation of Summaries," Proceedings of the Workshop on text Summarization Branches Out (WAS 2004), Barcelona, Spain, Jul. 25-26, 2004. ROUGE measures the accuracy of a system as a function of the proportion of words in a reference summary that are present in a system-created summary and may be defined as:

$$ROUGE_N = \frac{\Sigma_{S \in ReferenceSummaries}\Sigma_{N-gram \in S} count_{match}(N-\text{gram})}{\Sigma_{S \in ReferenceSummaries}\Sigma_{N-gram \in S} count(N-\text{gram})} \quad \text{(EQN. 2)}$$

where $count_{match}$ (N-gram) is the maximum number of N-grams co-occurring in both the reference and system-generated summaries and count (N-gram) is the total number of N-grams occurring in the reference summaries.

The second algorithm treats each sentence as a classification instance, and then featurizes each instance with a standard set of features commonly used for summarization. In one embodiment, these features include one or more of: the position of the sentence within the document (e.g., by sentence number and by general position), the presence of numbers in the sentence, the presence of pronouns in the sentence, the presence of capitalized words in the sentence, and the size of the sentence. In one embodiment, the classifier uses a training set in which sentences with the highest $ROUGE_1$ scores are labeled as positive (i.e., include in summary) and the remaining sentences are labeled as negative (i.e., do not include in summary).

In one embodiment, the second algorithm employs a support vector machine (SVM) as the statistical classifier. The SVM may be defined according to Hsu et al. ("A Practical Guide to Support Vector Classification," Department of Computer Science, National Taiwan University) as:

$$\text{minimize}_{w,b,\xi} \frac{1}{2} w^T + C \sum_{i=1}^{n} \xi_i \text{ such that } \xi_i \geq 0 \text{ and } y_i(w^T \phi(x_i) + b) \geq (1 - \xi_i) \quad \text{(EQN. 3)}$$

in which each sentence i is represented as a feature vector $x \in \Re^n$, with a label $y \in \{-1, +1\}^n$. The function $\phi$ maps the training vectors into a higher-dimensional feature space. In this case, w is the normal vector to the hyperplane, b is the size of the margin (i.e., the distance to the nearest training examples or support vectors from the optimal hyperplane separating the positive and negative classes), C>0 is the regularization parameter that represents the penalty of the error term, and $\xi_i \geq 0$ is a slack variable that measures the degree of misclassification of x. The SVM finds the optimal hyperplane with the maximal margin in this hyperspace. The output of the SVM is an array of scores for each sentence. In one embodiment, a trained model is supplied for English language documents based on data from the Document Understanding Conferences (DUC).

In one embodiment, the third algorithm is an unsupervised machine learning technique that identifies salient nodes in a directed graph via a random walk of the graph (e.g., a page rank technique). In a particular embodiment, the third algorithm treats the task of selecting sentences as a graph-based optimization problem. Specifically, the third algorithm represents sentences as nodes in a directed graph, and the edges between the nodes link sentences that occur later in the document to sentences that occur earlier in the document. The nodes are weighted, and are initially weighted according to the position of the corresponding sentence in the document (e.g., sentences occurring earlier in the document are weighted more heavily, and the weights decay exponentially as sentences occurring later in the document are encountered). The initial weights are adjusted based on the links between the corresponding nodes, where the weight $w_{xy}$ of a link that connects nodes x and y is calculated as a modified cosine similarity score according to:

$$w_{xy} = \frac{\sum_{i=1}^{n} (x_i \cdot y_i)}{\sqrt{\sum_{i=1}^{n} (x_i)^2 \cdot \sum_{i=1}^{n} (y_i)^2}} \quad \text{(EQN. 4)}$$

where the terms (e.g., words) in a sentence are numbered from 1 to n, and the weight of term i in sentence x is represented as $x_i$. In one embodiment, the weight of a term is the frequency of the term in the corresponding sentence, divided by the number of sentences in the document that contain the term.

As discussed above, in one embodiment, the third algorithm uses a page rank technique that identifies salient nodes in the directed graph. One particular page rank technique that may be implemented as the third algorithm is disclosed in detail by Brin et al. in "The Anatomy of a Large-Scale Hypertextual Websearch Engine," Computer Networks and ISDN Systems, 30, 1-7 (1998); and Mihalcea in "Graph-Based Ranking Algorithms for Sentence Extraction, Applied to Text Summarization," Proceedings of the 42$^{nd}$ Annual Meeting of the Association for Computational Linguistics (ACL 2004), Barcelona, Spain. In one particular embodiment, each node of the graph is weighted based on the weights of the incoming links from later nodes that point to the node in question, normalized by the weights of the outgoing links to which the node in question points. In essence, the page rank technique is used to identify the dominant nodes resulting from the random walk. Thus, the weight (or score) of a node may be calculated as:

$$\text{Score}(V_i) = (1-d) + d * \Sigma_{V_j \in \text{Incoming}(V_i)} w_{ji} \frac{\text{Score}(V_j)}{\Sigma_{V_k \in \text{Outgoing}(V_j)} w_{kj}} \quad \text{(EQN. 5)}$$

The weights of the edges out of a node are re-normalized to represent transition probabilities. The output is an array of scores, one for each sentence. This approach tends to weight first mentions more heavily, resulting in a spreading of weight across topics, where a sentence including a first mention of a topic is considered to be representative of the topic.

Once the sentence has been scored for informativeness in accordance with the appropriate algorithm, the method proceeds to step 512. In step 512, the summarizer 212 determines whether the informativeness of the sentence is greater than or equal to a first defined threshold. If the summarizer 212 concludes in step 512 that the informativeness of the sentence is less than to the first defined threshold, then the summarizer 212 discards the sentence in step 516. The method 500 then proceeds to step 520, where the summarizer 212 determines whether there are any sentences remaining to evaluate.

Alternatively, if the summarizer 212 concludes in step 512 that the informativeness of the sentence is greater than or equal to the first defined threshold, then the method 500 proceeds to step 514. In step 514, the summarizer 212 evaluates the coherence of the sentence; thus, step 514 aims to maintain the readability of each sentence of the summary that is ultimately produced. In one embodiment, the coherence of the sentence is scored by assigning weights to the sentence based on various Boolean features whose presence makes the sentence more or less readable (e.g., whether the sentence is surrounded by quotation marks, whether the sentence includes a question, whether the sentence includes a pronoun, whether the sentence appears to be missing a quotation mark, the length of the sentence, among other features).

In step 518, the summarizer 212 determines whether the sentence's coherence is greater than or equal to a second defined threshold. If the summarizer 212 concludes in step 518 that the sentence's coherence is less that the second defined threshold, then the method 500 proceeds to step 516, and the summarizer 212 discards the sentence as discussed above.

Alternatively, if the summarizer 212 concludes in step 518 that the sentence's coherence is greater than or equal to the second defined threshold, then the method 500 proceeds to step 520.

In step 520, the summarizer 212 determines whether there are any sentences remaining to evaluate. If the summarizer 212 concludes in step 520 that there are sentences remaining to evaluate, then the method 500 returns to step 508, and the summarizer 212 proceeds as described above to select and evaluate a next sentence from the document.

Alternatively, if the summarizer 212 concludes in step 520 that there are no sentences remaining to evaluate, then the method 500 proceeds to step 522. In another embodiment, there may be sentences that have not been evaluated, but the summarizer 212 may decide not to evaluate the document any further anyway (e.g., the summarizer may have already obtained a sufficient number of sentences) and simply proceed. In step 522, the summarizer 212 generates a subsequence of pruned sentences. In one embodiment, the subsequence is generated using a combinatorial optimizer.

In one embodiment, the combinatorial optimizer uses a dynamic programming technique that solves the classic 0/1 knapsack problem as posited by Goddard in "Dynamic Programming: 0-1 Knapsack Problem" (2012, www.cse.unl.edu/~goddard/Courses/CSCE310J), which is defined as follows: given a set of i items, each item having a weight and a value, determine which items to put in a knapsack such that the total weight is less than or equal to a limit and such that the total value is maximized. Couched in terms of summarization, the problem may be stated as follows:

$$\text{Maximize} \sum_{i=1}^{\text{NumSents}} \text{informativeness}(x_i), \text{ where } x_i \in \{0, 1\} \quad \text{(EQN. 6)}$$

$$\text{such that} \sum_{i=1}^{\text{NumSents}} \text{length}(x_i) \le \text{Target Length}$$

Using a standard dynamic programming solution to the 0/1 knapsack problem, the most informative subsequence of sentences 1 to i that has a total length of p will either contain sentence i, or it will not contain sentence i. If the length of sentence i is greater than p, then sentence i is excluded, and the summarizer 212 chooses the most informative subsequence of sentences 1 to i−1. Otherwise, the value of the most informative subsequence of sentences 1 to i is the maximum of two numbers: (1) the value of the most informative subsequence of sentences 1 to i−1 that has a total length of p; and (2) the sum of (a)+(b), where a is the value of the most informative subsequence of sentences 1 to i−1 that has a total length of p-length(sentence i), and b is the informativeness of sentence i. If (2) is greater, then sentence i is selected for inclusion in the summary; otherwise, sentence i is not selected.

Thus, in summary, the optimizer is provided in step 522 with a target length for the subsequence, along with the all of the pruned sentences and their informativeness scores. The optimizer then returns the best subsequence of sentences based on the target length and the informativeness of the sentences. In one embodiment, the sentences are ordered in the subsequence according to the order in which they appeared in the document.

In step 524, the summarizer 212 outputs the subsequence as a document summary (e.g., to a user endpoint device 108, 110, 112, or 114 or to the database 106). The method 500 then ends in step 526.

Figure 6:
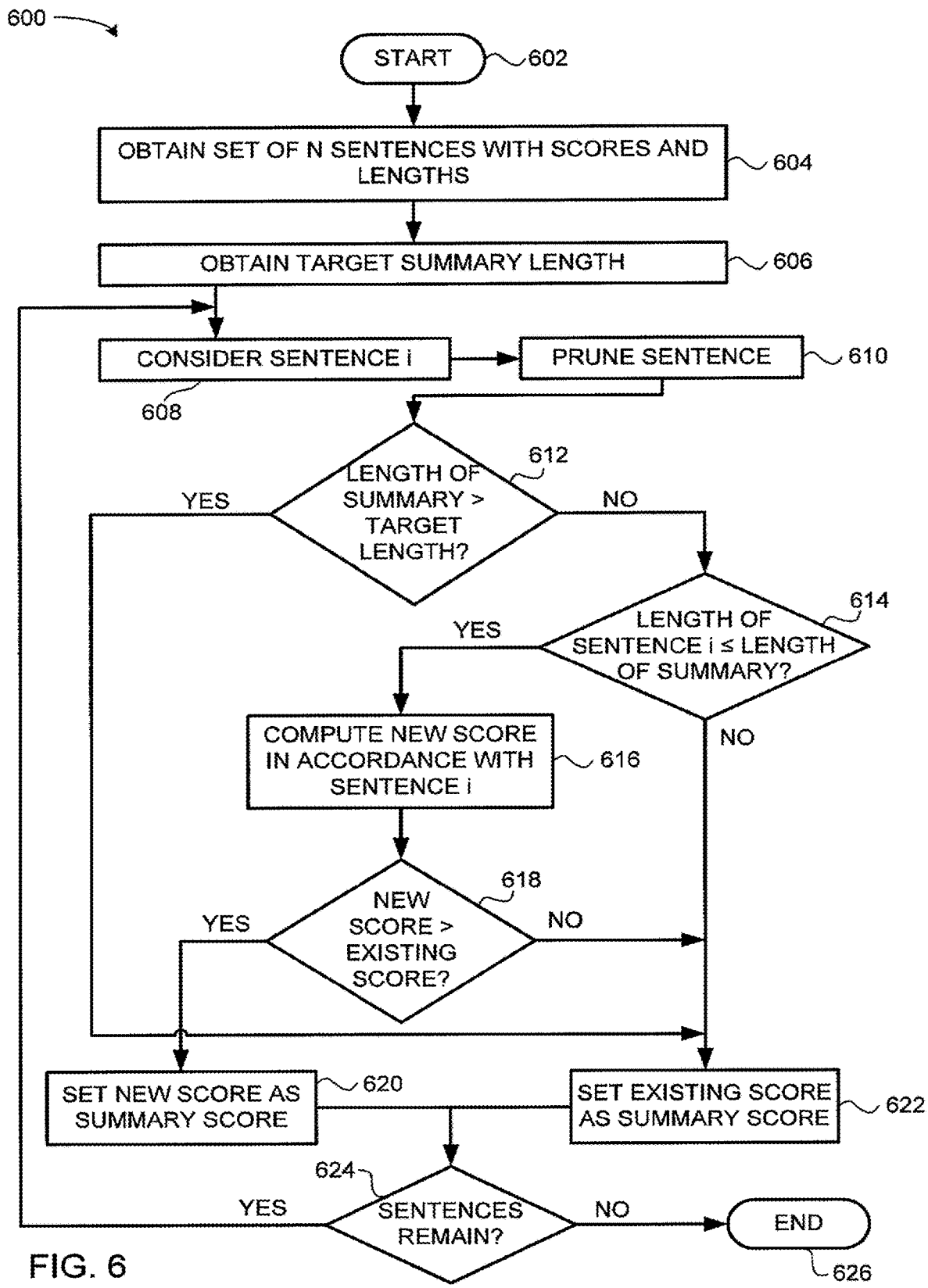
FIG. 6 is a flow diagram illustrating one embodiment of a method for selecting a set of sentences to form a document summary, according to the present invention.

FIG. 6 is a flow diagram illustrating one embodiment of a method 600 for selecting a set of sentences to form a document summary, according to the present invention. The method 600 may be implemented, for example, in accordance with step 522 of the method 500 and at the application server 104 illustrated in FIGS. 1 and 2. As such, reference is made in the discussion of the method 600 to various elements illustrated in FIG. 2. It will be appreciated however, that the method 600 is not limited to implementation with the server configuration illustrated in FIG. 2, and that such references are made largely to facilitate explanation.

The method 600 builds a summary as it evaluates a set of sentences on a sentence-by-sentence basis. Thus, the summary may evolve and change as the method 600 works its way through the set of sentences.

The method 600 begins in step 602. In step 604, the summarizer 212 obtains a set of N sentences, where each sentence has been processed in accordance with the method 500 as described above. In addition, each sentence is associated with an informativeness score, as described above and a sentence length.

In step 606, the summarizer 212 obtains a target summary length. The target length may be a default length or may be user-defined.

In step 608, the summarizer 212 considers a sentence i from the set of N sentences. In one embodiment, sentences are selected from the set in the order in which they appear in the source document.

In step 610, the summarizer 212 prunes the sentence. In one embodiment, pruning the sentence involves one or more reductions that eliminate material from the sentence. In one embodiment, certain types of material can be eliminated or reduced regardless of the language in which the sentence is written (e.g., date lines, bold prefixes, parentheticals). The sentence is pruned so as to not affect the sentence's coherency, although pruning may affect the sentence's informativeness.

In another embodiment, certain types of material that can be eliminated or reduced are specific to certain languages. For example, in one English-language-specific embodiment, step 610 may involve removing the English-language term "which is." Alternatively, step 610 may involve replacing the English-language term "which have" with the English-language term "with," or replacing the term "which [verb]" with "[verb]ing" (e.g., "which go" becomes "going"). In a further embodiment, step 610 may involve lowering coordination from a pair of English-language clauses with co-referential subjects to their verb pairs (e.g., "The rogue computer program destroyed data over a five month period, and the program infected close to one hundred computers," becomes "The rogue computer program destroyed data over a five month period and infected close to one hundred computers"). In a further embodiment still, step 610 may involve assuming a co-reference component that resolves references of noun phrases, pronouns, and/or proper names.

In step 612, the summarizer 212 determines whether the current length of the summary is greater than the target length. If the summarizer 212 concludes in step 612 that the current length of the summary is greater than the target length, then the summarizer 212 sets the existing score as the summary score in step 622, and the sentence i is not included in the summary. In one embodiment, the score is initialized at the start of the method 600 to zero and increases according to the scores of sentences that are selected for inclusion in the summary.

Alternatively, if the summarizer 212 concludes in step 612 that the current length of the summary is not greater than the target length, then the method 600 proceeds to step 614. In step 614, the summarizer 212 determines whether the length of the selected sentence i is less than or equal to the length of the current summary. In one embodiment, the summary is initialized as an empty set whose membership increases as sentences are selected for inclusion in the summary.

If the summarizer 212 concludes in step 614 that the length of the selected sentence i is greater than the length of the current summary, then the summarizer 212 sets the existing score as the summary score in step 622, and the sentence i is not included in the summary as discussed above.

Alternatively, if the summarizer 212 concludes in step 614 that the length of the selected sentence i is less than or equal to the length of the current summary, the method 600 proceeds to step 616. In step 616, the summarizer 212 computes a new score for the summary that considers the inclusion of the sentence i. As discussed above, the new score is the maximum of two numbers: (1) the value of the most informative subsequence of sentences 1 to i−1 that has a total length of p; and (2) the sum of (a)+(b), where a is the value of the most informative subsequence of sentences 1 to i−1 that has a total length of p-length(sentence i), and b is the informativeness of sentence i. In one embodiment, if the sentence has not been pruned, the sentence's informativeness score (b) has already been computed by the summarizer 212 (e.g., in accordance with the method 500).

In step 618, the summarizer 212 determines whether the new score is greater than the existing score. If the summarizer 212 concludes in step 618 that the new score is not greater than the existing score, then the summarizer 212 sets the existing score as the summary score in step 622, and the sentence i is not included in the summary as discussed above.

Alternatively, if the summarizer 212 concludes in step 618 that the new score is greater than the existing score, then the summarizer sets the new score as the summary score in step 620. In this case, the sentence i may be included in the summary. If the sentence i is the first sentence to be added to the summary, then the sentence i is included unconditionally. If the sentence i is not the first sentence to be added to the summary, then in one embodiment, the sentence i is included unconditionally. However, in another embodiment, the sentence i is included if it is related to the summary accumulated so far. Whether the sentence i is related to the summary can be determined by computing the overlap of words contained in the sentence i with words contained in the summary so far, and determining whether the overlap satisfies a threshold.

Once the summary score has been set in accordance with either step 620 or step 622, the method 600 proceeds to step 624, and the summarizer determines whether there are any sentences in the set of N sentences that remain to be evaluated. If the summarizer 212 concludes in step 624 that there are sentences remaining to be evaluated, then the method 600 returns to step 608, and the summarizer 212 considers a new sentence for evaluation as discussed above.

Alternatively, if the summarizer 212 concludes in step 624 that there are no sentences remaining to be evaluated, then the method 600 ends in step 626.

FIG. 7 is a high level block diagram of the present invention implemented using a general purpose computing device 700. In one embodiment, the general purpose computing device 700 is deployed as an application server, such as the AS 104 illustrated in FIG. 1. It should be understood that embodiments of the invention can be implemented as a physical device or subsystem that is coupled to a processor through a communication channel. Therefore, in one embodiment, a general purpose computing device 700 comprises a processor 702, a memory 704, a summarization module 705, and various input/output (I/O) devices 706 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., summarization module 705) can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the summarization 705 for automatically summarizing an electronic document described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method, comprising:
   obtaining, by a processor, a set of sentences, each sentence of the set being associated with a sentence length;
   obtaining, by the processor, a current score and a current length of an existing summary;
   selecting, by the processor, a sentence from the set of sentences;
   pruning, by the processor, the selected sentence;
   including, by the processor, the selected sentence in the existing summary only if the length of the sentence is not greater than the current length of the existing summary, a calculated length of a new summary that considers inclusion of the selected sentence does not exceed a target summary length and a calculated score of the new summary that considers inclusion of the selected sentence is greater than the current score;
   if the selected sentence is included, setting, by the processor, the calculated length as the current length, the calculated score as the current score, and the new summary as the existing summary; and
   selecting, by the processor, a next sentence from the set of sentences and repeating the pruning, including, and setting steps until all sentences of the set of sentences have been selected.

2. The method of claim 1, wherein the existing summary is initialized as an empty set and the current score and the current length for the initialized existing summary are zero.

3. The method of claim 1, wherein selecting the sentence from the set of sentences is based on an order sentences appear in a source document.

4. The method of claim 1, wherein pruning the selected sentence comprises one or more reductions that eliminate material from the selected sentence.

5. The method of claim 1, wherein each sentence of the set is associated with a coherence score, the coherence score being obtained by assigning weights to the sentence based on various Boolean features whose presence makes the sentence more or less readable.

6. The method of claim 5, wherein a pruning of the selected sentence does not affect the coherence score of the sentence.

7. The method of claim 1, wherein each sentence of the set is associated with an informativeness score, the informativeness score being assigned in accordance with a scoring technique that is language-independent.

8. The method of claim 7, wherein the calculated score of the new summary that considers inclusion of the selected sentence is based on at least the informativeness score of the selected sentence.

9. The method of claim 1, wherein including the selected sentence in the existing summary only if the length of the sentence is not greater than the current length of the existing summary, the calculated length of the new summary that considers inclusion of the selected sentence does not exceed the target summary length and the calculated score of the new summary that considers inclusion of the selected sentence is greater than the current score, comprises:
   including, by the processor, the selected sentence unconditionally.

10. The method of claim 1, wherein including the selected sentence in the existing summary only if the length of the sentence is not greater than the current length of the existing summary, the calculated length of the new summary that considers inclusion of the selected sentence does not exceed the target summary length and the calculated score of the new summary that considers inclusion of the selected sentence is greater than the current score, comprises:
   determining, by the processor, that the selected sentence is not the first sentence to be added to the existing summary;
   determining, by the processor, that the selected sentence is related to the existing summary; and
   including, by the processor, the selected sentence in the existing summary.

11. The method of claim 10, wherein determining that the selected sentence is related to the existing summary comprises:
   computing, by the processor, an overlap of words contained in the selected sentence with words contained in the existing summary; and
   determining, by the processor, that the overlap satisfies a pre-determined threshold.

12. A non-transitory computer readable medium containing an executable program for summarizing an electronic document, where the program performs operations comprising:
   obtaining a set of sentences, each sentence of the set being associated with a sentence length;
   obtaining a current score and a current length of an existing summary;
   selecting a sentence from the set of sentences;
   pruning the selected sentence;
   including the selected sentence in the existing summary only if the length of the sentence is not greater than the current length of the existing summary, a calculated length of a new summary that considers inclusion of the selected sentence does not exceed a target summary length and a calculated score of the new summary that considers inclusion of the selected sentence is greater than the current score;

if the selected sentence is included, setting the calculated length as the current length, the calculated score as the current score, and the new summary as the existing summary; and selecting a next sentence from the set of sentences and repeating the pruning, including, and setting steps until all sentences of the set of sentences have been selected.

13. The non-transitory medium of claim 12, wherein the existing summary is initialized as an empty set and the current score and the current length for the initialized existing summary are zero.

14. The non-transitory medium of claim 12, the instructions for including the selected sentence in the existing summary only if the length of the sentence is not greater than the current length of the existing summary, the calculated length of the new summary that considers inclusion of the selected sentence does not exceed the target summary length and the calculated score of the new summary that considers inclusion of the selected sentence is greater than the current score further comprising instructions for:

including, by the processor, the selected sentence unconditionally.

15. The non-transitory medium of claim 12, the instructions for including the selected sentence in the existing summary only if the length of the sentence is not greater than the current length of the existing summary, the calculated length of the new summary that considers inclusion of the selected sentence does not exceed the target summary length and the calculated score of the new summary that considers inclusion of the selected sentence is greater than the current score further comprising instructions for:

determining that the selected sentence is not the first sentence to be added to the existing summary;

determining that the selected sentence is related to the existing summary; and including the selected sentence in the existing summary.

16. The non-transitory medium of claim 15, the instructions for determining that the selected sentence is related to the existing summary further comprising instructions for:

Computing an overlap of words contained in the selected sentence with words contained in the existing summary; and determining that the overlap satisfies a pre-determined threshold.

17. The non-transitory medium of claim 12, the instructions for selecting the sentence from the set of sentences being based on an order sentences appear in a source document.

18. The non-transitory medium of claim 12, the instructions for pruning the selected sentence comprising one or more reductions that eliminate material from the selected sentence.

19. The non-transitory medium of claim 12, wherein each sentence of the set is associated with an informativeness score, the informativeness score being assigned in accordance with a scoring technique that is language-independent.

20. The non-transitory medium of claim 12, wherein the calculated score of the new summary that considers inclusion of the selected sentence is based on at least the informativeness score of the selected sentence.

21. A system for summarizing an electronic document, comprising:

a processor; and a computer readable medium containing an executable program that causes the processor to perform operations comprising:

obtaining a set of sentences, each sentence of the set being associated with a sentence length;

obtaining a current score and a current length of an existing summary;

selecting a sentence from the set of sentences;

pruning the selected sentence;

including the selected sentence in the existing summary only if the length of the sentence is not greater than the current length of the existing summary, a calculated length of a new summary that considers inclusion of the selected sentence does not exceed a target summary length and a calculated score of the new summary that considers inclusion of the selected sentence is greater than the current score;

if the selected sentence is included, setting the calculated length as the current length, the calculated score as the current score, and the new summary as the existing summary; and selecting a next sentence from the set of sentences and repeating the pruning, including, and setting steps until all sentences of the set of sentences have been selected.

\* \* \* \* \*